United States Patent [19]
Charnley et al.

[11] Patent Number: 5,912,936
[45] Date of Patent: Jun. 15, 1999

[54] PIPE CONNECTOR ASSEMBLY

[75] Inventors: James Edward Charnley, Nevada City; Gerald Alan Deaver, San Jose, both of Calif.

[73] Assignee: General Electric Company, Schenectady, N.Y.

[21] Appl. No.: 08/909,283

[22] Filed: Aug. 11, 1997

[51] Int. Cl.[6] .................................................. G21C 15/00
[52] U.S. Cl. ........................ 376/282; 376/286; 285/334.1
[58] Field of Search .................... 376/277, 282, 376/286, 285, 352, 463; 285/334.1, 334.4, 332.1, 167, 261

[56] References Cited

U.S. PATENT DOCUMENTS

| | | | |
|---|---|---|---|
| 592,681 | 10/1897 | Barnhart | 285/334.1 |
| 2,687,229 | 8/1954 | Laurent | 285/334.4 |
| 4,238,291 | 12/1980 | Neuenfeldt et al. | 376/285 |
| 4,452,474 | 6/1984 | Hagner | 285/334.1 |
| 4,648,632 | 3/1987 | Hagner | 285/334.1 |
| 4,840,409 | 6/1989 | Welkey | 285/167 |
| 5,050,913 | 9/1991 | Lenz | 285/332.1 X |
| 5,192,095 | 3/1993 | Behrens | 285/332.1 |
| 5,737,380 | 4/1998 | Deaver et al. | 376/352 |

*Primary Examiner*—Daniel D. Wasil
*Attorney, Agent, or Firm*—Armstrong Teasdale LLP

[57] ABSTRACT

Pipe connector assembly for replacing a core spray line in a nuclear reactor without field cutting, measuring, or welding such line. In one embodiment, the pipe connector assembly includes a first coupling member, a second coupling member, and at least one locking element. The first coupling member includes a flange, a pipe engaging portion, a spherical convex seat portion, a bore and a stud bore. The second coupling member includes a flange having a spherical concave seat portion for receiving the convex seat portion of the first coupling member, a pipe engaging portion, a bore, and a stud bore. The locking element includes at least one spherical washer and a crimp mechanism and couples the first coupling member and the second coupling member by extending through the flange stud bores. The spherical seat portions allow the coupling members to be rotationally misaligned while remaining to be substantially coaxially aligned thus accommodating additional core spray line length while maintaining a leak tight connection.

19 Claims, 3 Drawing Sheets

PIPE CONNECTOR ASSEMBLY

FIELD OF THE INVENTION

This invention relates generally to nuclear reactors and, more particularly, to assemblies and methods for coupling piping within reactor pressure vessels of such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spargers inside the RPV and to cool the core. Typically, core spray piping is coupled between a nozzle in the RPV and a shroud connection in the shroud.

Stress corrosion cracking (SCC) is a known phenomenon occurring in reactor components, such as structural members, piping, fasteners, and welds, exposed to high temperature water. The reactor components are subject to a variety of stresses associated with, e.g., differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Reactor internal piping, such as core spray lines inside the reactor pressure vessel, occasionally require replacement as a result of SCC. One known method of replacing a core spray line requires draining the RPV and taking field measurements of the precise distance, e.g., horizontal and vertical, between the nozzle and the shroud connection. A replacement core spray line is then cut utilizing the measurements, and such replacement line is then welded in place. Replacing a core spray line typically requires considerable down time, and is tedious.

It would be desirable to provide an assembly which facilitates replacing a core spray line without requiring detailed field measurements and cutting. It also be desirable to provide such an assembly which would enable a core spray line to be replaced without requiring any welding.

SUMMARY OF THE INVENTION

These and other objects are attained by an assembly which, in one embodiment, includes a pipe connector assembly for replacing a core spray line in a nuclear reactor without field cutting, measuring, or welding such line. The pipe connector assembly includes a first coupling member, a second coupling member, and at least one locking element.

The first coupling member includes a flange, a substantially cylindrical pipe engaging portion extending from a first surface of the flange and a spherical convex seat portion extending from a second surface of the flange. The second coupling member includes a flange having a spherical concave seat portion for receiving the convex seat portion of the first coupling member and a substantially cylindrical pipe engaging portion extending from a first surface of the second coupling member flange. The locking element includes at least one spherical washer and a crimp mechanism and couples the first coupling member and the second coupling member.

To replace core spray lines, three pipe sections and three pipe connector assemblies are typically used. The pipe sections are sized so that their total length matches or slightly exceeds the total length of the core spray line to be replaced. Generally, the first pipe assembly couples the first pipe section to a the second pipe section, the second pipe assembly couples the second pipe section to the third pipe section, and the third pipe assembly couples the third pipe section to a RPV nozzle. More particularly, and referring to the first pipe connector assembly only, a second end of the first pipe section is inserted into the first coupling member bore. Similarly, a first end of the second pipe section is inserted into the second coupling member bore. The coupling members are then positioned so that their respective bores are aligned, and the first coupling member seat is seated on the second coupling member seat. The locking elements are then extended through the respective stud bores to couple the first and second coupling members, and thus the first and second pipe sections, together. The second pipe connector assembly couples a second end of the second pipe section to the first end of the third pipe section in the same manner. The third pipe connector assembly couples a second end of the third pipe section to the RPV nozzle junction in the same manner.

Before fully securing the locking elements, a first end of the first pipe section is coupled to a shroud connector. Thereafter, the second and third pipe sections are positioned so that any excess core spray line length is accommodated by the rotational misalignment of the pipe sections and the pipe connector assemblies. Particularly, the first and second coupling members of each pipe connector assembly are rotated with respect to each other so that the various pipe sections move relative to each other. Thereafter the locking elements are fully secured. The resulting connection is essentially leak tight and is able to resist significant shear, axial, moment, and torsion loads.

The above-described pipe connector assembly is particularly suitable for use in nuclear reactor applications and facilitates replacing a core spray line without draining the reactor or welding. In addition, such assembly facilitates replacing a core spray line without requiring precise field measurements or cutting.

DETAILED DESCRIPTION

Figure 1:
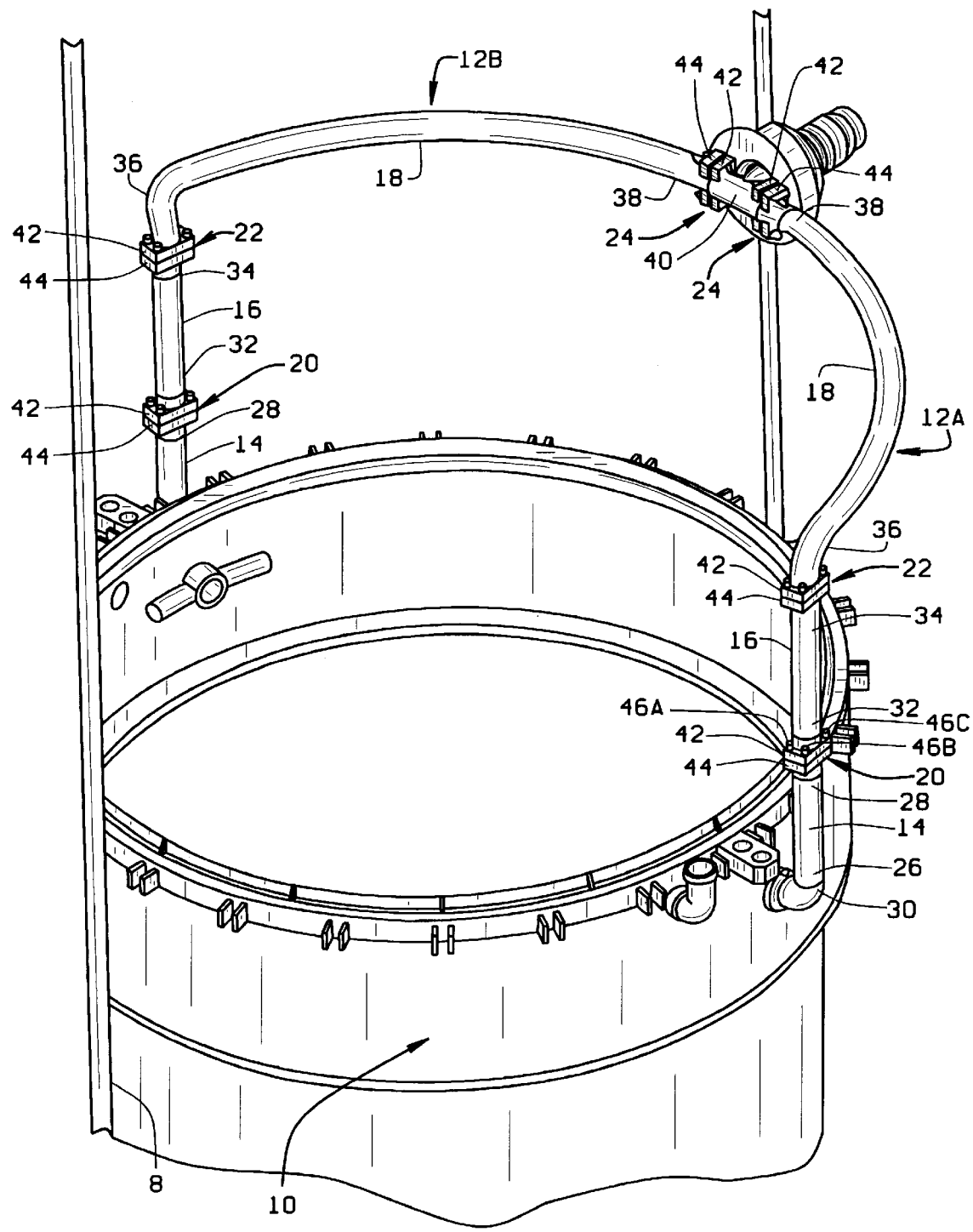
FIG. 1 is a perspective view with parts cut away of a reactor pressure vessel including two replacement core spray lines in accordance with one embodiment of the present invention.

FIG. 1 is a perspective view with parts cut away of a reactor pressure vessel (RPV) 8 and shroud 10 including two replacement core spray lines 12A and 12B in accordance with one embodiment of the present invention. Each replacement core spray line 12A and 12B includes a first pipe section 14, a second pipe section 16, a third pipe section 18, and pipe connector assemblies 20, 22, and 24.

Each first pipe section 14 has a first end 26, a second end 28, and a bore (not shown in FIG. 1) extending between first and second ends 26 and 28. First pipe section first end 26 is coupled to a shroud connector 30. Each second pipe section 16 also has a first end 32, a second end 34, and a bore (not shown in FIG. 1) extending between first and second ends 32 and 34. Each third pipe section 18 similarly has a first end 36, a second end 38, and a bore (not shown in FIG. 1) extending between first and second ends 36 and 38. Third pipe connector assembly 24 couples third pipe section second end 38 to a nozzle junction 40. Each pipe connector assembly 20, 22, and 24 includes a first coupling member 42, a second coupling member 44, and locking elements, or bolts, 46. In one embodiment, each pipe connector assembly 20, 22, and 24 includes four locking elements 46 (only three are shown in FIG. 1).

Figure 2:
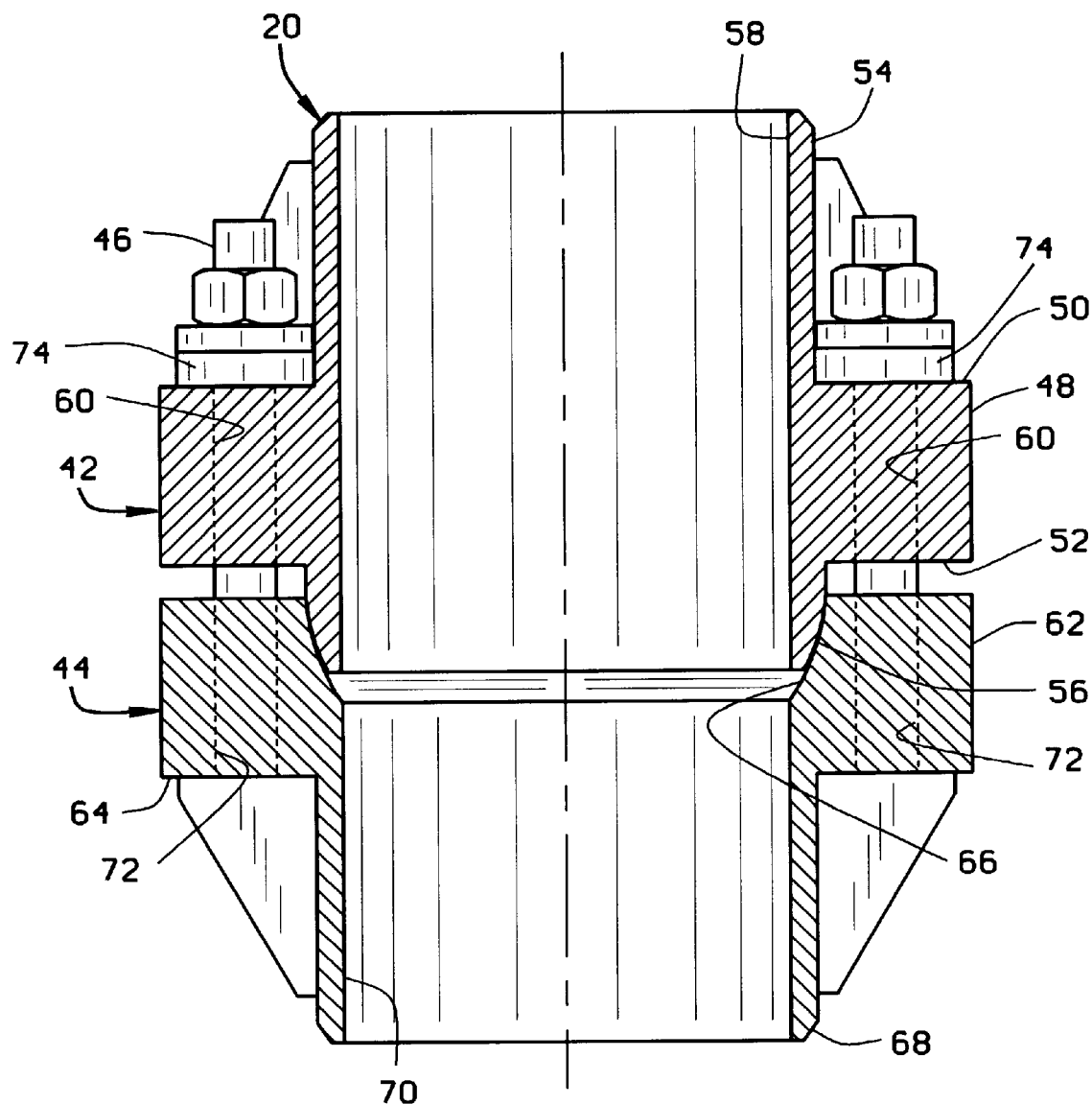
FIG. 2 is a schematic illustration of the pipe connector assembly shown in FIG. 1.

Referring to FIG. 2, first coupling member 42 includes a flange 48 having a first surface 50 and a second surface 52, a substantially cylindrical pipe engaging portion 54 extending from flange first surface 50, a spherical convex seat portion 56 extending from flange second surface 52, a bore 58 extending through first coupling member 42, and stud bores 60 extending through flange 48. Pipe engaging portion 54 is configured to be secured to pipe section 14, 16, or 18, or nozzle junction 40. Pipe engaging portion 54 may, for example, be secured to pipe sections 14, 16, or 18, or nozzle junction 40 in various manners, including, inserting pipe section 14, 16, or 18 into pipe engaging portion 54 and welding, or inserting pipe engaging portion 54 inside pipe section 14, 16, or 18 and welding, as well as abutting pipe section 14, 16, or 18 to pipe engaging portion 54 and welding.

Second coupling member 44 includes a flange 62 having a first surface 64, a spherical concave seat portion 66, a substantially cylindrical pipe engaging portion 68 extending from flange first surface 64, a bore 70 extending through second coupling member 44, and stud bores 72 extending through second coupling member flange 62. Pipe engaging section 68 is configured to be secured to pipe section 14, 16, or 18, shroud connector 32 or nozzle junction 40 in a manner similar to pipe engaging portion 54. Concave spherical seat portion 66 is configured to seat on first coupling member convex seat portion 56.

Locking elements 46 include at least one spherical washer 74 and crimp locking mechanism (not shown). Locking elements 46 are configured to extend through first coupling member stud bores 60 and second coupling member stud bores 72. Stud bores 60 and 72 have a diameter larger than a diameter of locking elements 46 and are elongated in an azimuthal direction.

First and second coupling members 42 and 44 are configured to be coupled by seating first coupling member seat portion 56 on second coupling member seat portion 66 and extending locking elements 46 through stud bores 60 and 72. Convex and concave spherical seat portions 56 and 66 are configured to substantially coaxially align first coupling member bore 58 and second coupling member bore 70 while allowing up to four degrees of rotational misalignment. Second pipe connector assembly 22 and third pipe connector assembly 24 are similarly configured.

Figure 3:
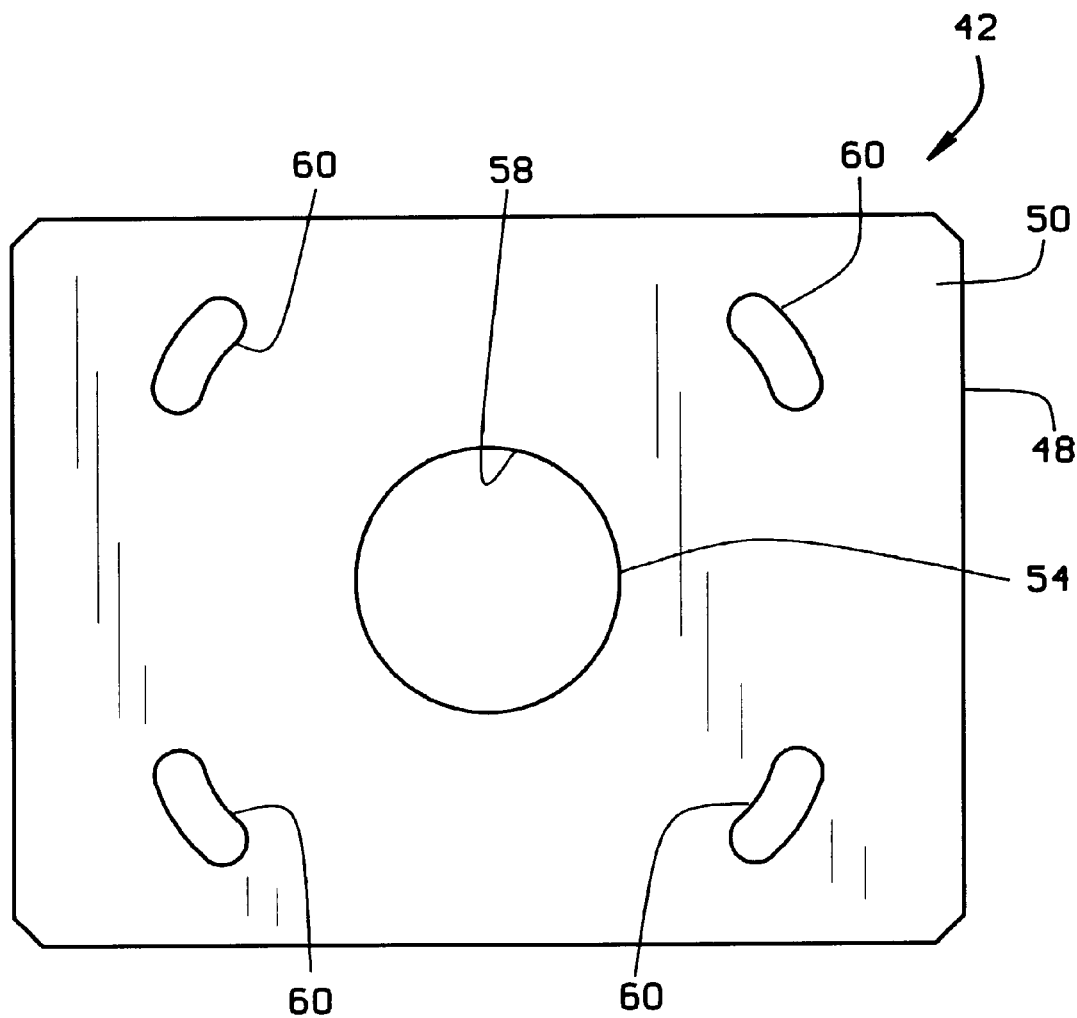
FIG. 3 is a top view schematic illustration of the pipe connector assembly shown in FIG. 2.

Referring to FIG. 3, and as described above, first coupling member 42 includes flange 48 having a first surface 50, a substantially cylindrical pipe engaging portion 54 extending from flange first surface 50, a bore 58 extending through first coupling member 42, and stud bores 60 extending through flange 48. Stud bores 60 have a diameter larger than a diameter of locking elements 46 (shown in FIG. 2) and are elongated in an azimuthal direction.

To replace core spray line 12A or 12B, three pipe sections 14, 16, and 18 and three pipe connector assemblies 20, 22, and 24 typically are used. Pipe sections 14, 16, and 18 are sized so that their total length meets or slightly exceeds the total length of core spray line 12A or 12B to be replaced. First pipe connector assembly 20 couples first pipe section 14 to second pipe section 16, second pipe connector assembly 22 couples second pipe section 16 to third pipe section 18, and third pipe connector assembly 24 couples third pipe section 18 to RPV nozzle junction 40. Particularly, first pipe connector assembly 20 couples first pipe section second end 28 to second pipe section first end 32. Second pipe connector assembly 22 couples second pipe section second end 34 to third pipe section first end 36. Third pipe connector assembly 24 couples third pipe section second end 38 to nozzle junction 40. Specifically, in one embodiment, first pipe section second end 28 is inserted at least partially into first pipe connector assembly 20 bore 70 and secured. Thereafter second pipe section first end 32 is inserted at least partially into first pipe connector assembly 20 bore 58 and secured. Second pipe section second end 34 is inserted at least partially into second pipe connector assembly 22 bore 70 and secured. Third pipe section first end 36 is inserted at least partially into second pipe connector assembly 22 bore 58 and secured. Third pipe section second end 38 is inserted at least partially into third pipe connector assembly 24 bore 70 and secured.

Thereafter three pipe sections 14, 16, and 18 are placed into RPV 10. First pipe section first end 26 is coupled, for example welded, to shroud connection 30. Third pipe connector assembly 24 first coupling member 42 bore 58 is then coupled, for example, welded, to nozzle junction 40. Third pipe connector assembly 24 second coupling member 44 is then substantially coaxially aligned with third pipe connector assembly 24 first coupling member 42. Concave seat portion 66 of third pipe connector assembly 24 is then seated on third pipe connector assembly 24 convex seat portion 56. Locking elements 46 are then inserted through stud bores 60 and 72 to couple third pipe connector assembly 24 first coupling member 42 to second coupling member 44. Second pipe section 16 is then positioned so that first coupling member 42 of first pipe connector assembly 20 attached to first end 32 is substantially coaxially aligned with second coupling member 44 of first pipe connector assembly 20. Concave seat portion 66 of first pipe connector assembly 20 is then seated on first pipe connector assembly 20 convex seat portion 56. Locking elements 46 are then inserted through stud bores 60 and 72 to couple first pipe connector assembly 20 first and second coupling members 42 and 44. Similarly, second coupling member 44 of second pipe connector assembly 22 coupled to second pipe assembly second end 34 is coupled to first coupling member 42 of second pipe connector assembly 22 coupled to third pipe section first end 36. Concave seat portion 66 of second pipe connector assembly 22 is then seated on second pipe connector assembly 22 convex seat portion 56. Locking elements 46 are then inserted through stud bores 60 and 72 to couple second pipe connector assembly 22 first and second coupling members 42 and 44.

Prior to fully securing locking elements 46, second and third pipe sections 16 and 18 are rotationally misaligned to compensate for any extra pipe length. Due to rotational misalignment of pipes 16 and 18, pipe connector assembly 20, 22, and 24 flanges 48 and 62 may no longer be parallel. Elongated stud bores 60 and 72 in conjunction with spherical washers 74 provide a parallel surface for coupling locking elements 46 to pipe connector assemblies 20, 22, and 24. After proper positioning of pipe sections 16 and 18 and securing of locking elements 46, crimp locking mechanisms (not shown) are fully secured. The resulting connection is essentially leak tight and is able to resist significant shear, axial, moment, and torsion loads.

The above-described pipe connector assembly is particularly suitable for use in nuclear reactor applications and facilitates replacing a core spray line without draining the reactor or welding. In addition, such assembly facilitates replacing a core spray line without requiring precise field measurements or cutting.

From the preceding description of the present invention, it is evident that the objects of the invention are attained. Although the invention has been described and illustrated in detail, it is to be clearly understood that the same is intended by way of illustration and example only and is not be taken by way of limitation. The present invention, as described above, can be used in many RPV piping configurations other than a core spray line. Accordingly, the spirit and scope of the invention are to be limited only by the terms of the appended claims.

We claim:

1. A pipe connector assembly for coupling a first pipe section to a second pipe section in a nuclear reactor, said pipe connector assembly comprising:

a first coupling member comprising a flange, a substantially cylindrical pipe engaging portion extending from a first surface of said flange and a spherical convex seat portion extending from a second surface of said flange; and a second coupling member comprising a flange having a spherical concave seat portion for receiving said convex seat portion of said first coupling member and a substantially cylindrical pipe engaging portion extending from a first surface of said second coupling member flange, said first coupling member flange comprising at least one stud bore extending therethrough and said second coupling member flange comprising at least one stud bore extending therethrough, said stud bores configured to be elongate in an azimuthal direction.

2. A pipe connector assembly in accordance with claim 1 wherein said first coupling member pipe engaging portion is configured to engage the first pipe section and said second coupling member pipe engaging portion is configured to engage the second pipe section.

3. A pipe connector assembly in accordance with claim 1 wherein at least one locking element is configured to extend through said first and second coupling member stud bores.

4. A pipe connector assembly in accordance with claim 3 wherein said stud bores have a diameter larger than a diameter of said locking element.

5. A pipe connector assembly in accordance with claim 3 wherein said locking element further comprises at least one spherical washer.

6. A pipe connector assembly in accordance with claim 3 wherein said locking element further comprises at least one crimp locking mechanism.

7. A pipe connector assembly in accordance with claim 1 wherein said first coupling member convex spherical seat portion is configured to seat portion on said second coupling member concave spherical seat portion when said first coupling member is coupled to said second coupling member.

8. A pipe connector assembly in accordance with claim 7 wherein said first coupling member spherical seat portion is rotatable relative to said second coupling member spherical seat portion when said first coupling member is coupled to said second coupling member.

9. A pipe connector assembly in accordance with claim 7 wherein said convex and concave spherical seat portions allow up to four degrees of rotational misalignment when said first coupling member is coupled to said second coupling member.

10. A method of coupling a first pipe section to a second pipe section utilizing a pipe connector assembly, said pipe connector assembly having a first coupling member comprising a flange, a substantially cylindrical pipe engaging portion extending from a first surface of the flange and a spherical convex seat portion extending from a second surface of the flange, and a second coupling member comprising a flange having a spherical concave seat portion for receiving the convex seat portion of the first coupling member and a substantially cylindrical pipe engaging portion extending from a first surface of the second coupling member flange, the first coupling member flange comprising at least one stud bore extending therethrough and the second coupling member flange comprising at least one stud bore extending therethrough, the stud bores configured to be elongate in an azimuthal direction, said method comprising:

welding the first pipe section to the first coupling member;

welding the second pipe section to the second coupling member; and coupling the first coupling member to the second coupling member.

11. A method in accordance with claim 10 wherein said method further comprises the steps of welding the first pipe section to the first coupling member pipe engaging portion, and welding the second pipe section to the second coupling member pipe engaging portion.

12. A method in accordance with claim 10 wherein said method further comprises the step of seating the first coupling member convex seat portion on the second coupling member concave seat portion.

13. A method in accordance with claim 12 wherein said method further comprises the step of securing at least one locking element through the stud bores to couple the first and second coupling members.

14. A method in accordance with claim 13 further comprising the step of coupling at least one spherical washer and a crimp locking mechanism to the locking element.

15. A replacement core spray line, comprising:

a first pipe section;

a second pipe section; and a first pipe connector assembly coupling said first pipe section to said second pipe section, said first pipe connector assembly comprising a first coupling member comprising a flange, a substantially cylindrical pipe engaging portion extending from a flange first surface, and a convex spherical seat portion extending from a flange second surface, said first pipe connector assembly further comprising a second coupling member comprising a flange having a concave spherical seat portion for receiving said convex spherical seat portion of said first coupling member and a substantially cylindrical pipe engaging portion extending from a first surface of said second coupling member, said first coupling member pipe engaging portion configured to engage said first pipe section, said second coupling member pipe engaging portion configured to engage said second pipe section, said second coupling member concave spherical seat portion configured to seat on said first coupling member convex spherical seat portion, said first coupling member flange further comprising at least one stud bore extending therethrough, and said second coupling member flange further comprising at least one stud bore extending therethrough, said stud bores configured to be elongate in an azimuthal direction.

16. A replacement core spray line in accordance with claim 15 further comprising:

a third pipe section;

a second pipe connector assembly coupling said second pipe section to said third pipe section, said second pipe connector assembly comprising a first coupling member comprising a flange, a substantially cylindrical pipe engaging portion extending from a flange first surface, and a convex spherical seat portion extending from a flange second surface, said second pipe connector assembly further comprising a second coupling member comprising a flange having a concave spherical seat portion for receiving said convex spherical seat portion of said first coupling member and a substantially cylindrical pipe engaging portion extending from a first surface of said second coupling member, said first coupling member pipe engaging portion configured to engage said second pipe section, said second coupling member pipe engaging portion configured to engage said third pipe section, said second coupling member concave spherical seat portion configured to seat on said first coupling member convex spherical seat portion.

17. A replacement core spray line in accordance with claim 16 further comprising a third pipe connector assembly coupling said third pipe section to a nozzle junction, said third pipe connector assembly comprising a first coupling member comprising a flange, a substantially cylindrical pipe engaging portion extending from a flange first surface, and a convex spherical seat portion extending from a flange second surface, said third pipe connector assembly further comprising a second coupling member comprising a flange having a concave spherical seat portion for receiving said convex spherical seat portion of said first coupling member and a substantially cylindrical pipe engaging portion extending from a first surface of said second coupling member, said first coupling member pipe engaging portion configured to engage said third pipe section, said second coupling member pipe engaging portion configured to engage said nozzle junction, said second coupling member concave spherical seat portion configured to seat on said first coupling member convex spherical seat portion, and wherein said first pipe section is coupled to a shroud connector forming a fluid passage between the shroud connector and the nozzle junction.

18. A replacement core spray line in accordance with claim 15 wherein at least one locking element is configured to extend through said stud bores to couple said first coupling member to said second coupling member.

19. A replacement core spray line in accordance with claim 18 wherein said locking element further comprises at least one of a spherical washer and a crimp locking mechanism.

* * * * *